July 3, 1928.
E. G. THOMAS
1,675,961
PIVOT ADJUSTING MEANS
Filed June 16, 1926
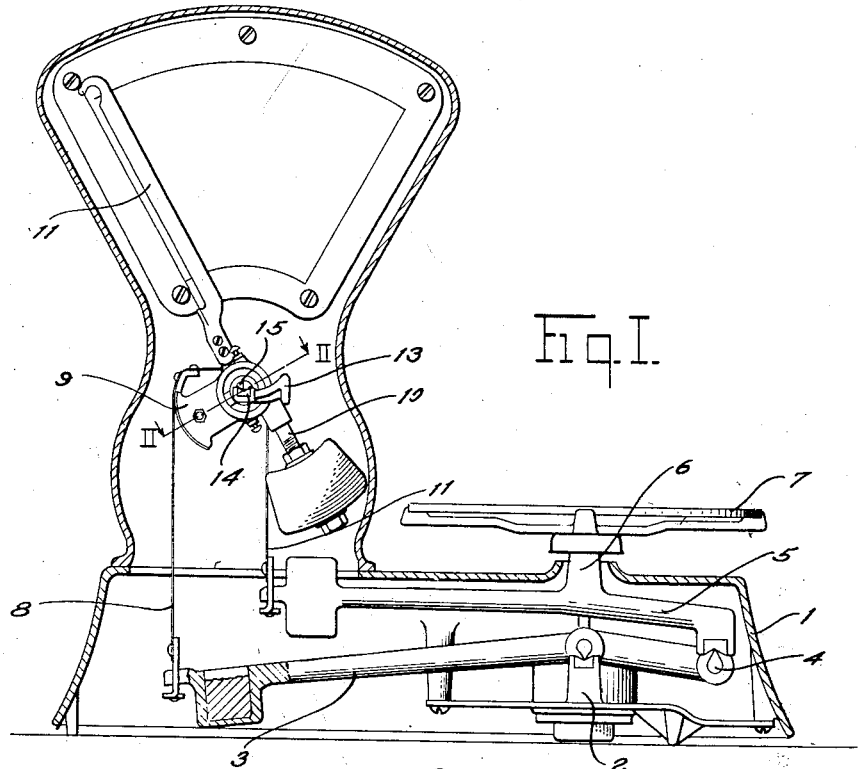
Fig. I.
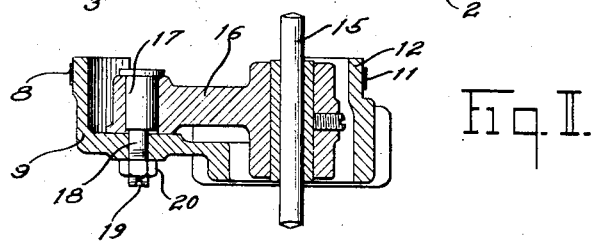
Fig. II.
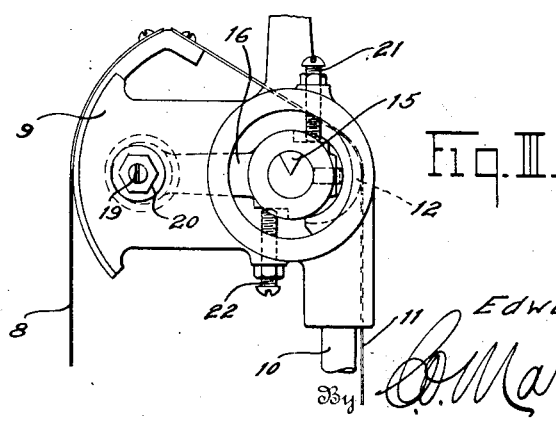
Fig. III.
Inventor
Edward G. Thomas.
By C. Marshall
Attorney Patented July 3, 1928.

1,675,961

UNITED STATES PATENT OFFICE.

EDWARD G. THOMAS, OF TOLEDO, OHIO, ASSIGNOR TO TOLEDO SCALE COMPANY, OF TOLEDO, OHIO, A CORPORATION OF NEW JERSEY.

PIVOT-ADJUSTING MEANS.

Application filed June 16, 1926. Serial No. 116,358.

This invention relates to pivot adjusting means, and particularly to means for adjusting the pivots of weighing scales, and its principal object is to provide an adjusting device capable of minute variations which may be manipulated while the scale is assembled so that the effect of the adjustment on the weighing qualities of the scale may be immediately noted.

Another object is to provide a device of this kind in which the pivot adjusting means is capable of being immediately locked in adjusted position.

Other objects and advantages will be apparent from the following description, in which reference is had to the accompanying drawings illustrating a preferred embodiment of my invention and wherein similar reference numerals designate similar parts throughout the several views.

In the drawings:—

Figure I is an elevational sectional view of a weighing scale embodying my invention;

Figure II is an enlarged detail sectional view taken substantially on the line II—II of Figure I; and Figure III is an elevational view of the parts illustrated in Figure II.

Referring to the drawings in detail, the scale in which I have shown my invention as embodied is of the so-called fan type having a base housing 1 within which is mounted a fulcrum stand 2 supporting a lever 3. The lever 3 is provided at one end with a load pivot 4 which carries a platter supporting frame 5 having an extension 6 upon which the platter 7 is mounted. The nose of the lever 3 is connected by means of a flexible metallic ribbon 8 to a sector 9 which forms a part of a pendulum 10 having an indicating hand 11 rigidly connected thereto. The end of the platter supporting frame 5 opposite its bearing on the load pivot 4 is also connected by means of a flexible metallic ribbon 11 to a sector 12, the arrangement being identical with that shown in Patent No. 1,591,578, issued upon the joint application of this applicant and Charles O. Marshall, the instant application being a continuation in part of the application upon which Patent No. 1,591,578 was issued.

The pendulum 10 is supported upon a fulcrum bracket 13 having a V grooved bearing 14 upon which the fulcrum pivot 15 of the pendulum rocks. In order that the scale may weigh correctly it is necessary that the fulcrum pivot 15 be accurately positioned with respect to the centers of the sectors 9 and 12, and it is the means for adjusting this fulcrum pivot which forms the subject matter of the invention claimed herein.

The pivot 15 is mounted in an arm 16 which swings upon an eccentric trunnion 17, the trunnion being rigid with a pin 18 which is mounted for rotatable adjustment in the pendulum body. The pin 18 is provided with a screw driver slot 19 and a lock nut 20. The end of the arm 16 in which the pivot 15 is mounted is held between adjusting screws 21 and 22 which are also provided with lock nuts. By turning one of the adjusting screws 21, 22 out and the other in the pivot 15 may be raised or lowered, and by turning the pin 18 it may be adjusted laterally. It will be seen that while the adjustments are positive they are extremely delicate.

The embodiment of my invention herein shown and described is to be regarded as illustrative only, and it is to be understod that the invention is susceptible to variation, modification and change within the spirit and scope of the subjoined claims.

Having described my invention, I claim:

1. In a device of the class described, in combination, an arm, a pivot mounted thereon, an anchor for said arm including an eccentric trunnion, and means for turning said eccentric trunnion for adjusting the position of said pivot.

2. In a device of the class described, in combination, a pivotally mounted arm, a pivot carried thereby, means for swinging said arm about its pivot and locking the same in adjusted position, and means for adjusting the position of the pivot of said arm.

3. In a device of the class described, in combination, an eccentric trunnion, an arm mounted thereon, a pivot carried by said arm, and means for swinging said arm about said trunnion and locking it in adjusted position.

4. In a device of the class described, in combination, an eccentric trunnion, an arm mounted thereon, a pivot carried by said arm, means for swinging said arm about said trunnion and locking it in adjusted position, and means for swinging said eccentric trunnion and locking it in adjusted position.

EDWARD G. THOMAS.